United States Patent [19]
Osadsky

[11] 3,733,636
[45] May 22, 1973

[54] COMBINATION BROOM SHOVEL, AND SCRAPER

[75] Inventor: Paul Osadsky, Racine, Wis.

[73] Assignee: Dawn E. Kawa, Racine, Wis.

[22] Filed: Apr. 15, 1971

[21] Appl. No.: 134,361

[52] U.S. Cl. ..........................15/111, 37/53, 294/51, 15/257.2
[51] Int. Cl. ..........................E01h 5/02, A47l 13/00
[58] Field of Search.....................15/111, 105, 257.2; 294/2, 51; 37/53; 7/1 N

[56] References Cited
UNITED STATES PATENTS
1,424,291   8/1922   Frank......................................15/111

FOREIGN PATENTS OR APPLICATIONS
1,030,474   3/1953   France .................................15/111

Primary Examiner—Leon G. Machlin
Attorney—Morsell & Morsell

[57] ABSTRACT

A combination implement including a broom, a shovel mounted on one side of said broom adapted to be shifted from a raised, inoperative position to a lowered, operative position projecting below the broom head, and a scraper mounted on the opposite side of said broom adapted to be shifted from a raised position to a lowered position projecting below said broom, said shovel and scraper forming rigid elements when in their raised, inoperative positions preventing the broom bristles from bending too far and breaking during use, thereby promoting the useful life of said broom.

5 Claims, 2 Drawing Figures

PATENTED MAY 22 1973      3,733,636

INVENTOR

Paul Osadsky

BY

Morsell & Morsell
ATTORNEYS

COMBINATION BROOM SHOVEL, AND SCRAPER

BACKGROUND OF THE INVENTION

1. Field of the Invention

The present invention relates to implements for sweeping, shoveling, or scraping dirt, grease, snow, or foreign matter or debris, and more particularly to a combination tool designed to accomplish all of said described functions.

2. Description of the Prior Art

Heretofore in an effort to provide a single unitary instrument capable of performing the dual function of sweeping and shoveling dirt or other matter, various tools have been designed combining a push-type broom with a shovel member. No one, however, has previously designed a tool incorporating a conventional broom, a shovel, and a scraper member in a single interchangeable unit. Moreover, to applicant's knowledge, no one has heretofore designed a triple-purpose implement as described wherein the rigid shovel and scraper are positionable in close, parallel relationship on opposite sides of the broom head when not in use in order to prevent the broom bristles from excessive bending or deflection, thereby substantially prolonging the life of a said broom.

Examples of prior patented dual-purpose implements of the types hereinabove described are disclosed in the following U.S. Pat. Nos. 1,319,306; 2,126,023; 2,867,827; 2,163,979; 603,071; 1,143,752; 1,922,998; and 3,334,939.

SUMMARY OF THE INVENTION

The present invention comprises a novel triple-purpose implement comprising a broom which can be used for sweeping in the conventional manner, a shovel adjustably mounted on said broom, and a scraper member also mounted on said broom for scraping grease or similar foreign matter, including hard-packed snow or ice, said multiple-purpose implement having particular utility in garages, filling stations, shops, and factories, as well as in homes.

A further important object of the present invention is to provide a novel triple-purpose implement as described wherein the rigid shovel and scraper are positionable in close, parallel relationship on opposite sides of the broom head when not in use in order to prevent the flexible broom bristles from being inadvertently bent or deflected to a degree wherein they are broken or damaged, thereby prolonging the life of said broom.

A further object of the invention is to provide a novel multiple purpose implement wherein said shovel and scraper are positioned in a raised, out-of-the-way position when it is desired to use the broom, as described, and which shovel and scraper members can be selectively manually lowered to a position projecting below the broom when it is required to utilize either of said members.

A further object of the invention is to provide a novel triple-purpose implement as described wherein the conversion of said implement for use either as a broom, a shovel, or as a scraper, can be accomplished quickly and easily, and without requiring the use of any special tools or equipment.

A further object is to provide a novel multiple purpose implement as described wherein said shovel and scraper can be readily individually releasably locked in either their retracted, out-of-the-way position or in their lowered operative condition.

A further object of the invention is to provide a novel combination implement as described which is relatively inexpensive to manufacture, as well as more convenient to store when not being used, as compared with the use of three separate implements or tools for accomplishing the same functions.

Still further objects of the present invention are to provide a novel combination broom, shovel, and scraper implement which is rugged and durable in construction, easy to use, and which is otherwise particularly well suited for its intended purposes.

BRIEF DESCRIPTION OF THE DRAWINGS

In the accompanying drawings, wherein there is illustrated one preferred embodiment of the invention, and wherein the same reference numerals designate the same parts in both of the views.

DESCRIPTION OF THE PREFERRED EMBODIMENT

Referring now more particularly to the drawings, the numeral 10 designates an elongated broom handle, which can be of conventional length and which can be formed of wood or any other suitable material. Mounted on the lower end of said handle 10 is a conventional broom head including a rigid metal upper portion 11 with a plurality of flexible bristles 12 projecting therefrom in the conventional manner, said broom being designed for sweeping dirt, debris, or other foreign matter as is customary.

Figure 1:
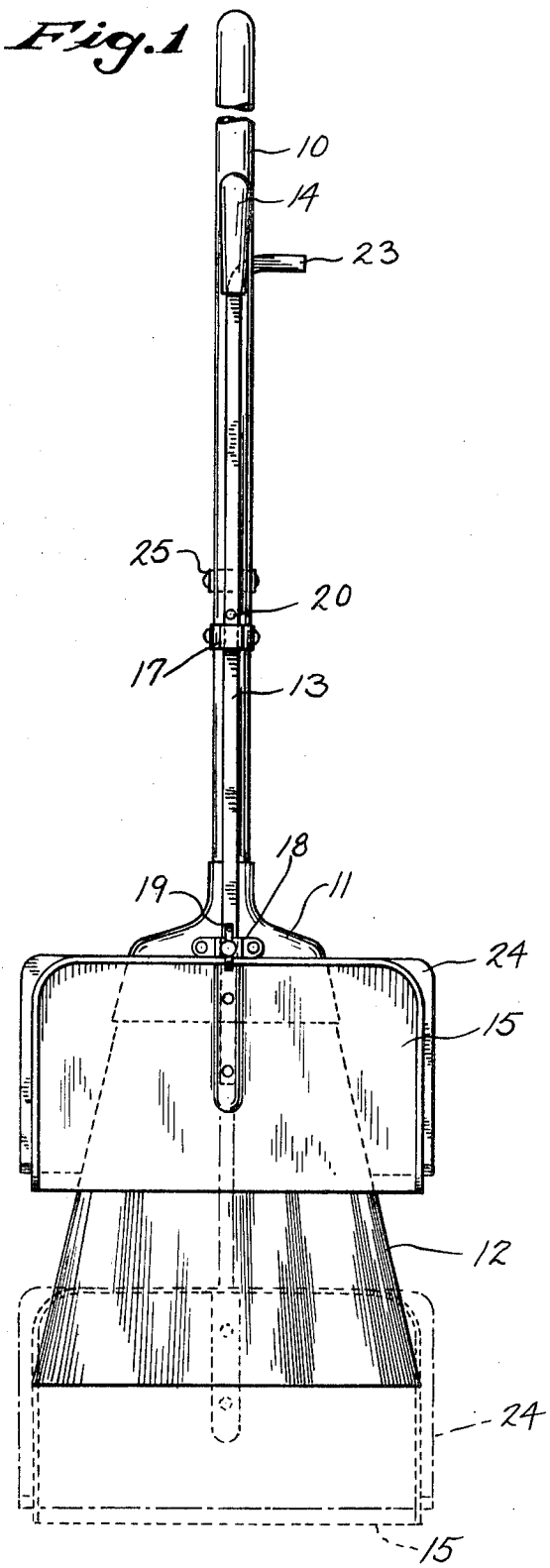
FIG. 1 is a top plan view of the new combination implement showing, in full lines, the shovel and scraper in their raised, out-of-the-way positions, and showing said members in broken lines in their lowered, operative positions.

In accordance with the present invention, mounted on one side of the broom handle 10 is an elongated rod 13 which is preferably shorter than said broom handle and which rod is provided with a knob 14 on its upper end. Said rod is longitudinally slideably secured to said broom handle by means of a U-shaped or sleeve-type bracket element 17 located at a point spaced above the broom head and by means of a second bracket element 18 mounted on the rigid metal portion 11 of said broom head. Permanently secured to the lower end of said rod 13 is a shovel blade 15 which is relatively flat, as shown, and which is of greater width than the broom. As will be seen in FIG. 1 of the drawings, said shovel blade can be lowered from the raised or retracted full-line position wherein it will not interfere with the normal use of the broom, to the lowered, broken-line position wherein said blade 15 projects below the lower ends of the broom bristles 12, and in which position said shovel can be used in the conventional manner.

Figure 2:
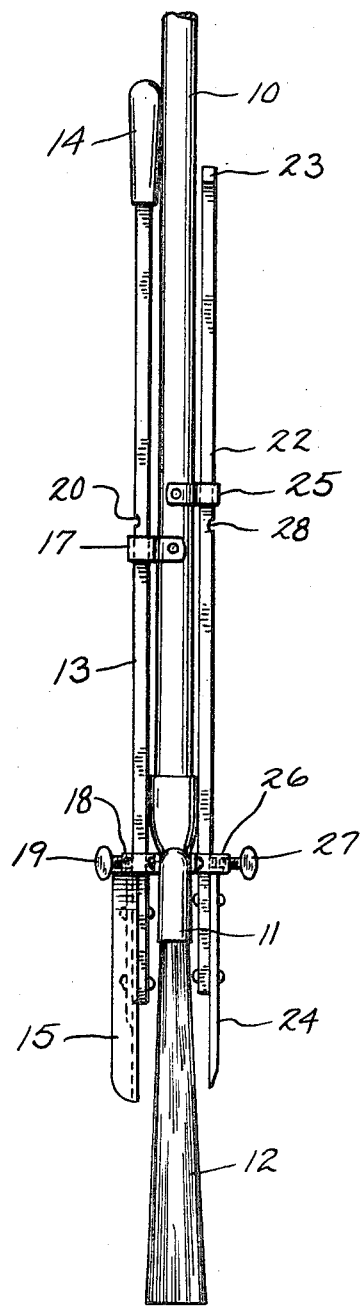
FIG. 2 is a side view of said implement.

As best appears in FIG. 2, the rod-retaining bracket 18 on the broom head is provided with a threaded, wing nut-type set screw 19 which can be manually turned inwardly to pressurably bear against the rod 13 to maintain the shovel blade 15 in a selected position such as in its raised, out-of-the-way position when it is desired to utilize the broom portion of the present invention. Said set screw 19 can be readily released to permit the lowering of said shovel head to an operative position projecting below the broom bristles when desired, said set screw then being rotated inwardly again to secure said shovel in its lowered position. The engagement of the handle 14 on the upper end of the rod with the bracket 17 prevents said shovel from sliding downwardly too far when the set screw 19 is loosened, and in the preferred form of the invention an indentation or aperture 20 formed in said shovel rod is so located that when the shovel blade is in its lowered, operative position said set screw will project into said indentation to effectively resist upward pressure during shoveling and to firmly retain said shovel member in its proper operative position.

As best appears in FIG. 2, mounted on the opposite side of the broom handle 10 is an elongated rod 22 having a laterally-projecting handle portion 23 at its upper end, and the lower end of said rod has a flat scraper or chopper blade 24 rigidly affixed thereto, said blade being of greater width than the broom head and being formed of steel or comparable strong, rugged material. As will be seen in said FIG. 2, said scraper blade, broom head, and shovel blade members are in parallel planes and are in close, face-to-face engagement.

The scraper rod 22 is longitudinally slideably secured to the broom handle 10 by means of an upper U-shaped bracket 25 located intermediate the length of said handle, and by means of a second, lower bracket element 26 on the metal portion 11 of the broom head. Said rod 22 can be slideably adjusted to lower the scraper blade 24 from the illustrated full-line position, where it will not interfere with the use of the broom, to a lowered position projecting below the broom bristles 12, as shown in broken lines in FIG. 1, in which position said blade 24 can be utilized for chopping ice or hard-packed ice or snow, or for scraping grease or other debris from the floor of a garage or filling station or the like. It is contemplated, in fact, that said scraper blade can be employed to loosen such foreign matter from the floor, and the broom or shovel portions of the present implement then utilized to sweep or shovel up said loosened material.

The lower bracket element 26 associated with said scraper rod 22 is provided with a threaded wing nut-type set screw 27 which can be manipulated to pressurably bear against said rod 22 to maintain the scraper blade in either its illustrated raised, out-of-the-way position, or in its lowered, operative position. An aperture or indentation 28 (FIG. 2) is preferably formed in said scraper rod to receive said set screw when the blade 24 is in its lowered position to securely retain said blade in its operative position when the implement is being used for scraping or chopping. The handle element 23 prevents said scraper from sliding too far downwardly and possibly becoming disengaged from the implement when the set screw 27 is loosened.

With respect to the particular design of the scraper and shovel handles, rod-retaining brackets, and set screw-type locking elements illustrated in the drawings and hereinabove described, it is to be understood that while the illustrated elements have been found to function effectively, and are of economical and practical construction, the exact design and positioning of said members is not critical to the invention and the invention is not to be limited or confined in this respect. What is intended to be covered herein is not only the illustrated design but also any and all variations or modifications thereof as may come within the spirit of the invention.

As will be seen in the drawings, when the shovel and scraper blades 15, 24 are in their raised, retracted positions, as when it is desired to utilize the broom for sweeping purposes, said blade members lie flat against the upper portion of said flexible broom bristles, said blades preferably extending downwardly to a point spaced somewhat below the midpoint of said bristles. The result is that said blades 15, 24 prevent the broom bristles from being bent or deflected too far during the sweeping operation and possibly becoming bent or broken, as can occur with conventional brooms.

In the use of the implement, if it is desired to utilize the scraper blade 24 for scraping grease or similar sticky or hardened substances from the floor of a garage, filling station, factory, or the like, or for scraping or chopping ice from a sidewalk or drive, the threaded set screw 27 is first released and the scraper blade 24 is lowered to a position projecting below the bristles 12 of the broom. Said set screw is then turned inwardly again to clampingly retain the blade 24 in said lowered position, and said scraper can then be employed to accomplish the desired function.

When it is desired to utilize the implement as a shovel, the scraper blade 24 is locked in its retracted, out-of-the-way position, and the shovel set screw 19 is temporarily released, thus allowing the shovel blade 15 to be shifted downwardly and locked in its lowered, operative position extending below the broom bristles 12. In the latter position said shovel can be utilized in the conventional manner.

As hereinabove described, when it is desired to utilize only the broom portion of the present invention the scraper and shovel blades can be set and locked in their retracted, out-of-the-way condition where they do not interfere with the use of the broom, and in the latter position said blade members function to minimize the possibility of the broom bristles being excessively bent or deflected, and possibly broken.

Further advantages of the novel multiple-purpose implement comprising the present invention are that the conversion of said implement for use either as a broom, a shovel, or a scraper can be accomplished quickly and easily, and without requiring the use of any special tools. Moreover, said unitary combination implement is more convenient to store in comparison to the use of three separate implements or tools designed for individually performing the same operations.

It is to be understood that while one preferred embodiment of the present invention has been illustrated and described herein, it is contemplated that variations or modifications thereof may occur to those skilled in this art, and what is intended to be covered herein is not only the illustrated form of the invention but also any and all variations or modifications thereof as may come within the spirit of said invention.

What I claim is:

1. A multiple-purpose implement, comprising: a broom handle; a flat broom head on the lower end of said handle having a plurality of flexible bristles projecting downwardly therefrom; a shovel blade movably mounted on one side of said broom head, said shovel blade being shiftable from a raised, retracted position wherein a portion of said broom bristles project therebelow to permit the use of the broom for sweeping purposes, to a lowered position wherein said shovel blade projects below said bristles to permit the use of the implement for shoveling purposes; a scraper blade movably mounted on the opposite side of said broom head, said scraper blade being shiftable from a raised, retracted position wherein a portion of said broom bristles project therebelow to a lowered position wherein said scraper blade projects below said bristles to permit the use of the implement for scraping purposes, a rod connected to said shovel blade extending upwardly along one side of said broom handle, said rod being mounted for longitudinal movement to shift said shovel blade between its retracted position and its lowered, operative position; and a second rod connected to said scraper blade extending upwardly along the opposite side of said broom handle, said rod being mounted for longitudinal movement to shift said scraper blade between its retracted position and its lowered, operative position.

2. The implement recited in claim 1 and including means for individually releasably locking said rods to retain said shovel and scraper blades in either their raised or lowered positions.

3. The implement recited in claim 2 wherein said locking means comprises set screws adapted to be manipulated into and out of clamping engagement with said longitudinally adjustable rods.

4. The implement recited in claim 2 wherein said shovel and scraper rods are longitudinally adjustably secured to said broom by means including brackets mounted on said broom handle.

5. A multiple-purpose implement, comprising: a broom handle; a flat broom head on the lower end of said handle having a plurality of flexible bristles projecting downwardly therefrom; a shovel blade movably mounted on one side of said broom head, said shovel blade being shiftable from a raised, retracted position wherein a portion of said broom bristles project therebelow to permit the use of the broom for sweeping purposes, to a lowered position wherein said shovel blade projects below said bristles to permit the use of the implement for shoveling purposes; a scraper blade movably mounted on the opposite side of said broom head, said scraper blade being shiftable from a raised, retracted position wherein a portion of said broom bristles project therebelow to a lowered position wherein said scraper blade projects below said bristles to permit the use of the implement for scraping purposes, the upper portion of the broom bristles being positioned between the shovel blade and scraper blade, when said blades are in their raised retracted positions, thereby preventing damaging deflection of the bristles during sweeping.

* * * * *